United States Patent
Wang et al.

(10) Patent No.: US 12,236,094 B2
(45) Date of Patent: Feb. 25, 2025

(54) METHOD, DEVICE, AND COMPUTER PROGRAM PRODUCT FOR STORAGE

(71) Applicant: Dell Products L.P., Round Rock, TX (US)

(72) Inventors: Xingshan Wang, Shanghai (CN); Haiyan He, Shanghai (CN); Gary Jialei Wu, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/458,854

(22) Filed: Aug. 30, 2023

(65) Prior Publication Data

US 2025/0004641 A1  Jan. 2, 2025

(30) Foreign Application Priority Data

Jun. 30, 2023  (CN) .......................... 202310797464.9

(51) Int. Cl.
*G06F 3/06*  (2006.01)

(52) U.S. Cl.
CPC ............ *G06F 3/061* (2013.01); *G06F 3/0655* (2013.01); *G06F 3/0676* (2013.01); *G06F 3/0679* (2013.01); *G06F 2212/7201* (2013.01)

(58) Field of Classification Search
CPC ...... G06F 3/061; G06F 3/0655; G06F 3/0676; G06F 3/0679; G06F 2212/7201
See application file for complete search history.

(56) References Cited

U.S. PATENT DOCUMENTS

| | | | |
|---|---|---|---|
| 11,966,610 B2* | 4/2024 | Yoo | G06F 3/0688 |
| 2014/0310499 A1* | 10/2014 | Sundararaman | G06F 12/0269 |
| | | | 711/203 |
| 2018/0069923 A1* | 3/2018 | Tsalmon | G06F 15/17331 |
| 2020/0241749 A1* | 7/2020 | Freyensee | G06F 3/0683 |

\* cited by examiner

*Primary Examiner* — Kalpit Parikh
(74) *Attorney, Agent, or Firm* — Amin, Turocy & Watson, LLP (57) ABSTRACT

The subject disclosure relates to storage. An example method includes receiving an input/output (I/O) request based on a protocol related to a first type of storage medium. The method further includes determining a namespace among a plurality of namespaces that is associated with the I/O request. The method further includes determining a binary file corresponding to the determined namespace based on a mapping relationship. The method further includes reading from and/or writing to a second type of storage medium based on the determined binary file, the second type being different from the first type. In this manner, a unified underlying storage implementation with software definition capabilities is provided, which enables different types of storage media to be operated as namespaces, thereby enabling the deployment of a storage system to adapt to more platforms and scenarios.

20 Claims, 8 Drawing Sheets

METHOD, DEVICE, AND COMPUTER PROGRAM PRODUCT FOR STORAGE

RELATED APPLICATION

The present application claims the benefit of priority to Chinese Patent Application No. 202310797464.9, filed on Jun. 30, 2023, which application is hereby incorporated into the present application by reference herein in its entirety.

TECHNICAL FIELD

Embodiments of the present disclosure relate generally to the field of storage, and more specifically to a method, a device, and a computer program product for storage.

BACKGROUND

Object storage is a data storage and management method that organizes, stores, and accesses data in the form of objects. Object storage treats data and the metadata associated with it as objects and uses a unique identifier to distinguish each object. These objects may be various types of files, multimedia contents, database backups, and so on.

Object storage has been widely used in data-intensive scenarios such as cloud storage, big data analysis, backup and archiving, among others, and is advantageous in storing and managing massive unstructured data.

SUMMARY

Embodiments of the present disclosure provide a solution for storage, by which different types of storage media can be accessed with a unified underlying storage implementation.

In a first example embodiment of the present disclosure, a method for storage is provided. The method includes: receiving an input/output (I/O) request based on a protocol related to a first type of storage medium. The method further includes: determining a namespace among a plurality of namespaces that is associated with the I/O request. The method further includes: determining a binary file corresponding to the determined namespace based on a mapping relationship. The method further includes: reading from and/or writing to a second type of storage medium based on the determined binary file, the second type being different from the first type.

In another example embodiment of the present disclosure, a device for storage is provided. The device includes a processor and a memory coupled to the processor and having instructions stored thereon, wherein these instructions, when executed by the processor, cause the device to perform actions including: receiving an input/output (I/O) request based on a protocol related to a first type of storage medium. These actions further include: determining a namespace among a plurality of namespaces that is associated with the I/O request. These actions further include: determining a binary file corresponding to the determined namespace based on a mapping relationship. These actions further include: reading from and/or writing to a second type of storage medium based on the determined binary file, the second type being different from the first type.

In a further example embodiment of the present disclosure, a computer program product is provided. The computer program product is tangibly stored on a non-transitory computer-readable storage medium and includes computer-executable instructions, wherein the computer-executable instructions, when executed, cause a computer to perform the method or process according to the embodiments of the present disclosure.

In example solutions for storage according to embodiments of the present disclosure, a unified underlying storage implementation with software definition capabilities is provided, which enables different types of storage media to be operated as namespaces, thereby enabling the deployment of a storage system to adapt to more platforms and scenarios.

It should be noted that this Summary part is provided to introduce a series of concepts in a simplified manner, which will be further described in the Detailed Description below. This Summary part is neither intended to identify key features or necessary features of the present disclosure, nor intended to limit the scope of the present disclosure.

BRIEF DESCRIPTION OF THE DRAWINGS

By description of embodiments of the present disclosure in more detail with reference to the accompanying drawings, the above and other objectives, features, and advantages of the present disclosure will become more apparent, where.

Throughout all the drawings, the same or similar reference numerals generally represent the same or similar elements.

DETAILED DESCRIPTION

The following will describe the embodiments of the present disclosure in more detail with reference to the accompanying drawings. Although certain embodiments of the present disclosure are illustrated in the accompanying drawings, it should be understood that the present disclosure can be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and its variations should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects, unless otherwise specifically indicated.

As described above, object storage offers a number of advantages that make it suitable for data-intensive scenarios. Some object storage systems can be deployed on platforms with different types of storage media (e.g., hard disk drives (HDDs) and solid state drives (SSDs) (such as Non-Volatile Memory express SSDs, i.e., NVMe SSDs), and so on). The underlying storage interface or underlying storage implementation is often implemented in different ways for different types of storage media. For example, in the case of an HDD, a storage server (SS) is configured to persist data to a disk based on boost ASIO. For another example, in the case of an NVMe, an Nvme engine with a Non-Volatile Memory express over Fabric (NVMe-oF) is used. Different underlying storage implementations make the maintenance cost of products high, and in some cases, it is difficult to meet customer needs.

In these example underlying storage implementations, the SS is configured to access HDDs based on a file system, while for NVMe-oF, access is conducted at a block layer. So, in a layered cluster, HDDs and NVMe SSDs need to be connected to different nodes, which also increases the deployment restrictions.

In a current object storage system, the SS stores data to HDDs based on a file system. When the system is enabled, each HDD is formatted, and a number of files (e.g., binary files) are created at a fixed size. In addition, in the current object storage system, the Nvme engine uses user space initiators and kernel targets. The target of the NVMe-oF is the kernel module in Linux, which lies above the block layer and below the file system layer of the kernel storage system. In this way, existing HDD deployments and NVMe deployments cannot be unified with current underlying storage implementations (SSs and Nvme engines).

To solve at least the above and other potential problems, an embodiment of the present disclosure provides a method for storage. The solution includes: receiving an input/output (I/O) request based on a protocol related to a first type of storage medium. The solution further includes: determining a namespace among a plurality of namespaces that is associated with the I/O request. The solution further includes: determining a binary file corresponding to the determined namespace based on a mapping relationship. The solution further includes: reading from and/or writing to a second type of storage medium based on the determined binary file, the second type being different from the first type. In this manner, a unified underlying storage implementation with software definition capabilities is provided, which enables different types of storage media to be operated as namespaces, thereby enabling the deployment of a storage system to adapt to more platforms and scenarios.

The basic principles and some example implementations of the present disclosure are illustrated below with reference to FIG. 1 to FIG. 8. It should be understood that these example embodiments are given only to enable those skilled in the art to better understand and thus implement the embodiments of the present disclosure, and are not intended to limit the scope of the present disclosure in any way.

Figure 1:
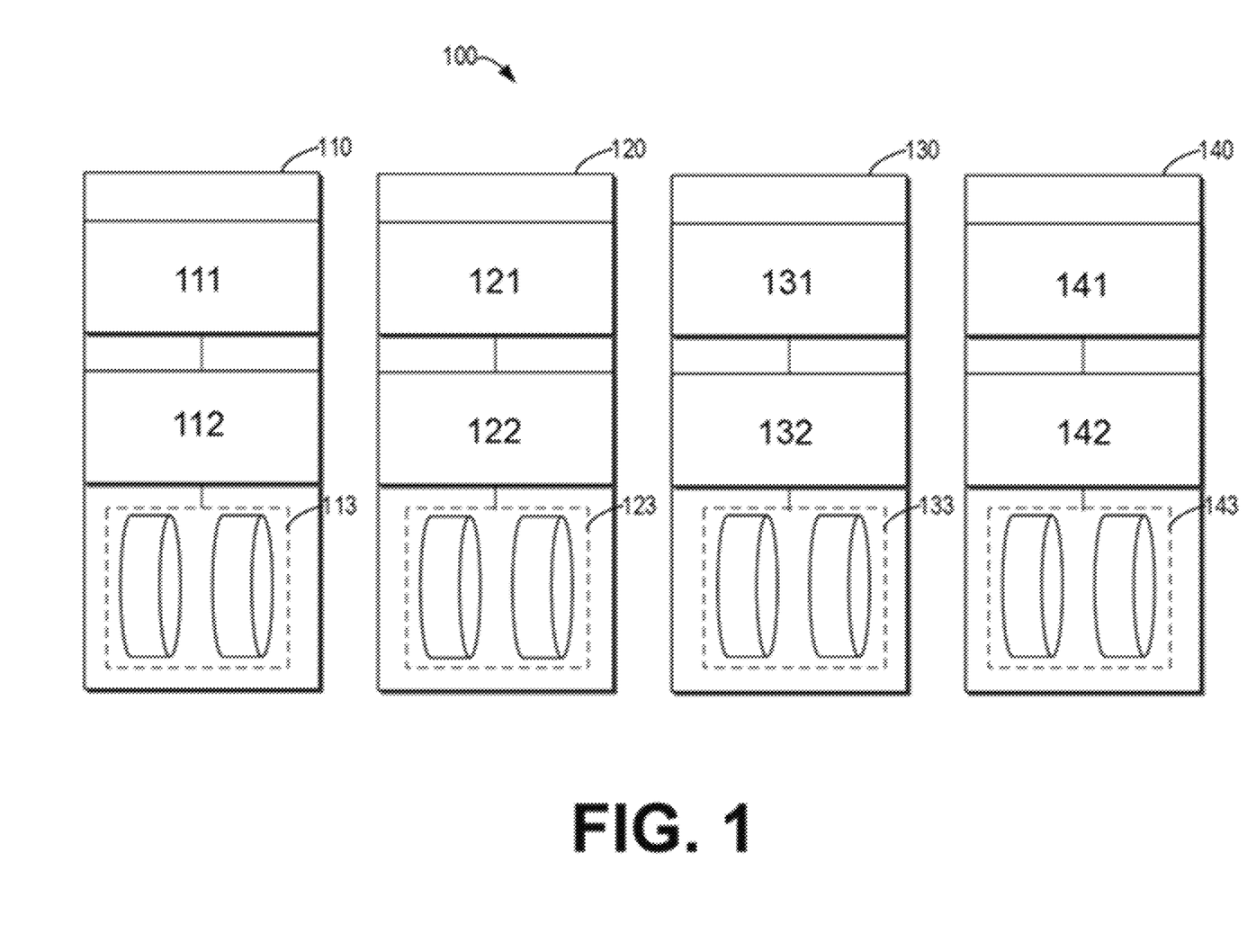
FIG. 1 illustrates a schematic diagram of an example environment in which a method and/or process according to embodiments of the present disclosure can be implemented.

FIG. 1 illustrates a schematic diagram of an example environment 100 in which a method and/or process according to embodiments of the present disclosure can be implemented. The example environment 100 illustratively illustrates a layered storage system that includes a plurality of nodes. As shown in FIG. 1, the layered storage system includes four nodes, namely, a node 110, a node 120, a node 130, and a node 140. It should be understood that the four nodes are illustrated herein for ease of understanding and illustrative purposes only, and embodiments of the present disclosure are not limited thereto. For example, a storage system according to embodiments of the present disclosure may include a greater or smaller number of nodes.

The layered storage system shown in FIG. 1 may be an object storage system. According to embodiments of the present disclosure, each of the plurality of nodes included in the storage system may include a client terminal for a user to initiate a reading operation and/or a writing operation. As shown in FIG. 1, the node 110 may include a client terminal 111, the node 120 may include a client terminal 121, the node 130 may include a client terminal 131, and the node 140 may include a client terminal 141. In some embodiments, the client terminal of each node may be an S3-based client terminal. It should be understood that the client terminal of each node may also be other different client terminals, and the present disclosure is not limited in this regard.

According to embodiments of the present disclosure, each of the plurality of nodes included in the storage system may include an underlying storage implementation (also referred to as an underlying storage interface) for access to the storage medium on the corresponding node. The underlying storage implementation of each node may be configured to perform reading operations and/or writing operations on the storage medium on that node. In addition, the underlying storage implementation of each node may be used to perform access to the storage medium on a node different from that node. For example, the underlying storage implementation of each node may be configured to perform reading operations and/or writing operations on the storage medium on a node different from that node.

As shown in FIG. 1, the node 110 may include an underlying storage implementation 112, the node 120 may include an underlying storage implementation 122, the node 130 may include an underlying storage implementation 132, and the node 140 may include an underlying storage implementation 142. By way of example and not limitation, the underlying storage implementation 112 of the node 110 may be configured to perform reading operations and/or writing operations on the storage media 113 on the node 110, and may be configured to perform reading operations and/or writing operations on the storage media 123, 133, and 143 on the nodes 120, 130, and 140. According to embodiments of the present disclosure, the underlying storage implementations of the plurality of nodes may be the same underlying storage implementation, regardless of whether the storage media on the plurality of nodes are the same type of storage media. This will be described in further detail below.

According to embodiments of the present disclosure, each of the plurality of nodes included in the storage system may include one or more storage media. These storage media may be block device-based storage media, such as HDDs or SSDs. These storage media may also include network attached storage (NAS) and storage area networks (SANs). In FIG. 1, two storage media are shown as an example for each node, which is only an example and not limiting. It should be understood that each node may include a greater or smaller number of storage media, that the storage media included in various nodes may be different types of storage media or the same type of storage media, and that the numbers of storage media included in different nodes may be different.

As shown in FIG. 1, the node 110 may include storage media 113, the node 120 may include storage media 123, the node 130 may include storage media 133, and the node 140 may include storage media 143. The storage media 113, 123, 133, and 143 may be different types of storage media, such as different types of block device-based storage media, but the underlying storage implementations 112, 122, 132, and 142 respectively corresponding to the storage media 113, 123, 133, and 143 may be the same. Hereinafter, a more detailed description will be given.

The schematic diagram of the example environment 100 in which the method and/or process according to embodiments of the present disclosure can be implemented is described above in conjunction with FIG. 1. A flow chart of a method 200 for storage according to an embodiment of the present disclosure will be described below with reference to FIG. 2. In order to provide a unified underlying storage implementation across different types of storage media, a method 200 for storage according to an embodiment of the present disclosure is proposed.

Figure 2:
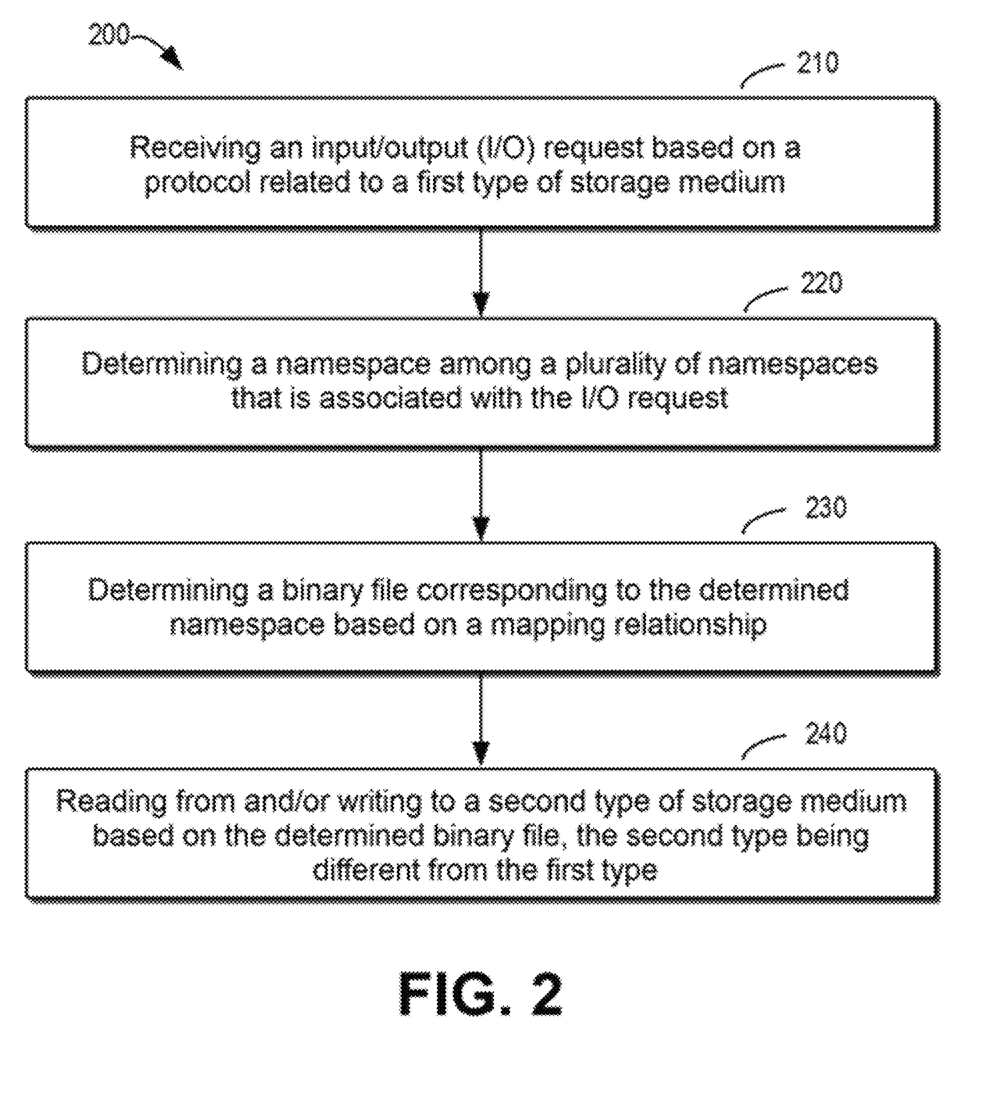
FIG. 2 illustrates a flow chart of a method for storage according to an embodiment of the present disclosure.

At block 210, an input/output (I/O) request based on a protocol related to a first type of storage medium is received. Upon receipt of the I/O request, the underlying storage implementation according to the embodiment of the present disclosure may be configured to access the associated storage medium. In some embodiments, the first type of storage medium may include an NVMe-oF-based storage medium, and the protocol related to the first type of storage medium may include NVMe-oF. Examples of the first type of storage medium may include an NVMe SSD. It should be understood that the first type of storage medium and the protocol related to the first type of storage medium described herein are examples and not limiting, and other different NVMe protocols and storage media supporting the protocols may also be included, which is not limited in the present disclosure.

At block 220, a namespace among a plurality of namespaces that is associated with the I/O request is determined. As described above, the first type of storage medium may include an NVMe-oF-based storage medium or a storage medium supporting other different NVMe protocols. The first type of storage medium may be accessed in the form of block storage access. According to embodiments of the present disclosure, a one-to-one mapping relationship is established between files (e.g., binary files) of a file system and the namespaces such that file system-based storage media can be accessed in the form of block-like storage access. In this way, different types of storage media can be operated as namespaces (e.g., NVMe namespaces). Hereinafter, the mapping process according to embodiments of the present disclosure will be described in further detail.

The second type of storage medium may include a file system-based storage medium. When an I/O request based on the protocol related to the first type of storage medium is received, a namespace associated with this I/O request will also be determined for the namespace of the second type of storage medium in addition to for the namespace of the first type of storage medium.

At block 230, a binary file corresponding to the determined namespace is determined based on a mapping relationship. In the case where the received I/O request based on the protocol related to the first type of storage medium involves the second type of storage medium, the corresponding binary file is determined based on the mapping relationship between the namespace determined at block 220 that involves the I/O request and a binary file of the file system of the second type of storage medium.

At block 240, reading from and/or writing to a second type of storage medium is performed based on the determined binary file, the second type being different from the first type. Based on the binary file among the binary files of the file system of the second type of storage medium determined at block 230 that involves the I/O request based on the protocol related to the first type of storage medium, operations (e.g., reading operations and/or writing operations) are performed on the determined binary file, thereby completing reading from and/or writing to the second type of storage medium.

Accordingly, according to embodiments of the present disclosure, a unified underlying storage implementation with software definition capabilities is provided that enables the use of the same underlying storage interface for different types of storage media, wherein all storage media are operated as namespaces, so that the deployment difficulty of a storage system is reduced, and more customer requirements can be met, such as updating the storage system.

Figure 3:
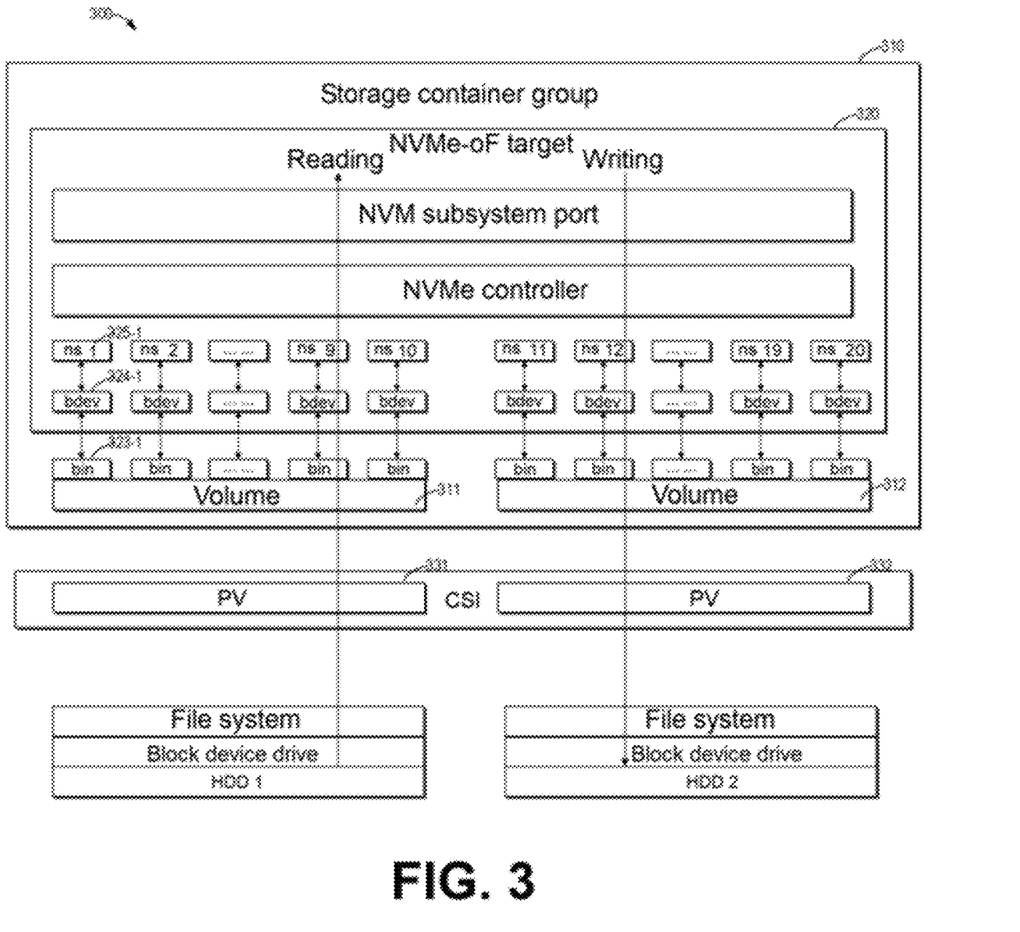
FIG. 3 is a schematic diagram illustrating a process for block-like storage access according to an embodiment of the present disclosure.

FIG. 3 is a schematic diagram illustrating a process 300 for block-like storage access according to an embodiment of the present disclosure. According to embodiments of the present disclosure, in addition to for NVMe-oF-based storage media, file system-based storage media can be accessed in such storage access manner, thereby reading from and/or writing to different types of storage media can be performed in the same or a similar manner with a unified underlying storage implementation.

According to embodiments of the present disclosure, a storage container group 310 (also referred to as a container group) may include a target service 320. As shown in FIG. 3, the storage container group 310 includes an NVMe-oF target 320, where the NVMe-oF target 320 may include an NVM subsystem port and an NVMe controller, and the NVMe-oF target 320 may also include a block device layer. The container group 310 may also include a host service (also referred to as an initiator service) and a plurality of volumes, such as volumes 311 and 332 as shown in FIG. 3. The plurality of volumes included in the container group 310 may correspond to a plurality of storage media on nodes. Hereinafter, the container group 310 and the target service 320 according to embodiments of the present disclosure will be described in further detail.

In order to access a file system-based storage medium in a block-like storage access manner, a plurality of files (e.g., a plurality of binary files (a plurality of bins)) of its file system may be mapped. According to embodiments of the present disclosure, a plurality of persistent volumes may be created based on a plurality of file system-based storage media. As shown in FIG. 3, a PV 331 may be created based on HDD 1, and a PV 332 may be created based on HDD 2. These file system-based storage media may each have a corresponding block device drive and have a file system overlaid thereon. Each of the plurality of persistent volumes may be mapped to one of the plurality of volumes in the container group. As shown in FIG. 3, the created PV 331 and PV 332 may be respectively mapped to volumes 311 and 312 in the container group. Hereinafter, the mapping of persistent volumes to volumes in a container group according to the present disclosure will be described in further detail.

According to embodiments of the present disclosure, for a file system-based storage medium, a plurality of binary files of its file system are mapped to the target service in the container group, wherein each of the plurality of binary files may be abstracted or represented as one block device. As shown in FIG. 3, for the HDD 1, a plurality of files of its file system are mapped to the target service 320 in the container group 310, and each of the plurality of binary files may be abstracted or represented as one block device. For example, a binary file 323-1 may be abstracted or represented as a block device (bdev) 324-1. The mapping from binary files to block devices can be in a one-to-one correspondence, and in the mapping from the binary files to the block devices, the mapping of pages in the binary files that are used to store metadata can be avoided, which can improve the mapping efficiency.

According to embodiments of the present disclosure, taking an HDD as an example of the file system-based storage medium, a plurality of binary files in the container group that correspond to one HDD may be arranged by a file system of the HDD to correspond to one of the plurality of volumes in the container group. As shown in FIG. 3, a plurality of binary files in the container group 310 that correspond to the HDD 1 may be arranged to correspond to the volume 311 in the container group.

As described above, each of the plurality of binary files is mapped to the target service in the container group such that each of the plurality of binary files corresponds to each of a plurality of block devices. According to embodiments of the present disclosure, after each of the plurality of binary files is mapped to each of the plurality of block devices, a namespace (as illustratively shown in FIG. 3 as ns 1-ns 20) may be assigned to each block device, wherein the assigned namespace uniquely identifies the corresponding block device. For example, as illustrated in FIG. 3, after the binary 323-1 is mapped to the block device 324-1, a namespace 325-1 may be assigned to the block device 324-1, with the namespace 325-1 uniquely identifying the block device 324-1. The block device layer may include a plurality of block devices as well as namespaces assigned to that plurality of block devices. In this way, the mapping from binary files to namespaces is completed, and the binary file corresponding to the pointing can be uniquely found through the corresponding namespace, and vice versa.

According to embodiments of the present disclosure, for a file system-based storage medium, a plurality of binary files of its file system may be created to have a fixed size, and the usage state of each of the created plurality of binary files may be recorded by a service or application. In addition, the data size used to access each of the plurality of binary files may be aligned with a block size. In this way, in the mapping from the binary files to the block devices, pages (e.g., the last page) in the binary files that are used to store metadata can be skipped.

According to embodiments of the present disclosure, the file system-based storage medium can be accessed in a block-like storage access manner through the mapping relationship between binary files of the file system and namespaces in the target service. For example, in the case of receiving a reading request and/or writing request from another container group different from the container group 310 (a reading stream/or writing stream as indicated by the arrows in FIG. 3), the namespace associated with the reading request and/or writing request can be determined. Based on the mapping relationship between namespaces and binary files, the binary file corresponding to the determined namespace can be determined. By performing operations on these binary files involving the reading request and/or writing request, the reading and/or writing objectives can be achieved in a block-like storage access manner.

Figure 4:
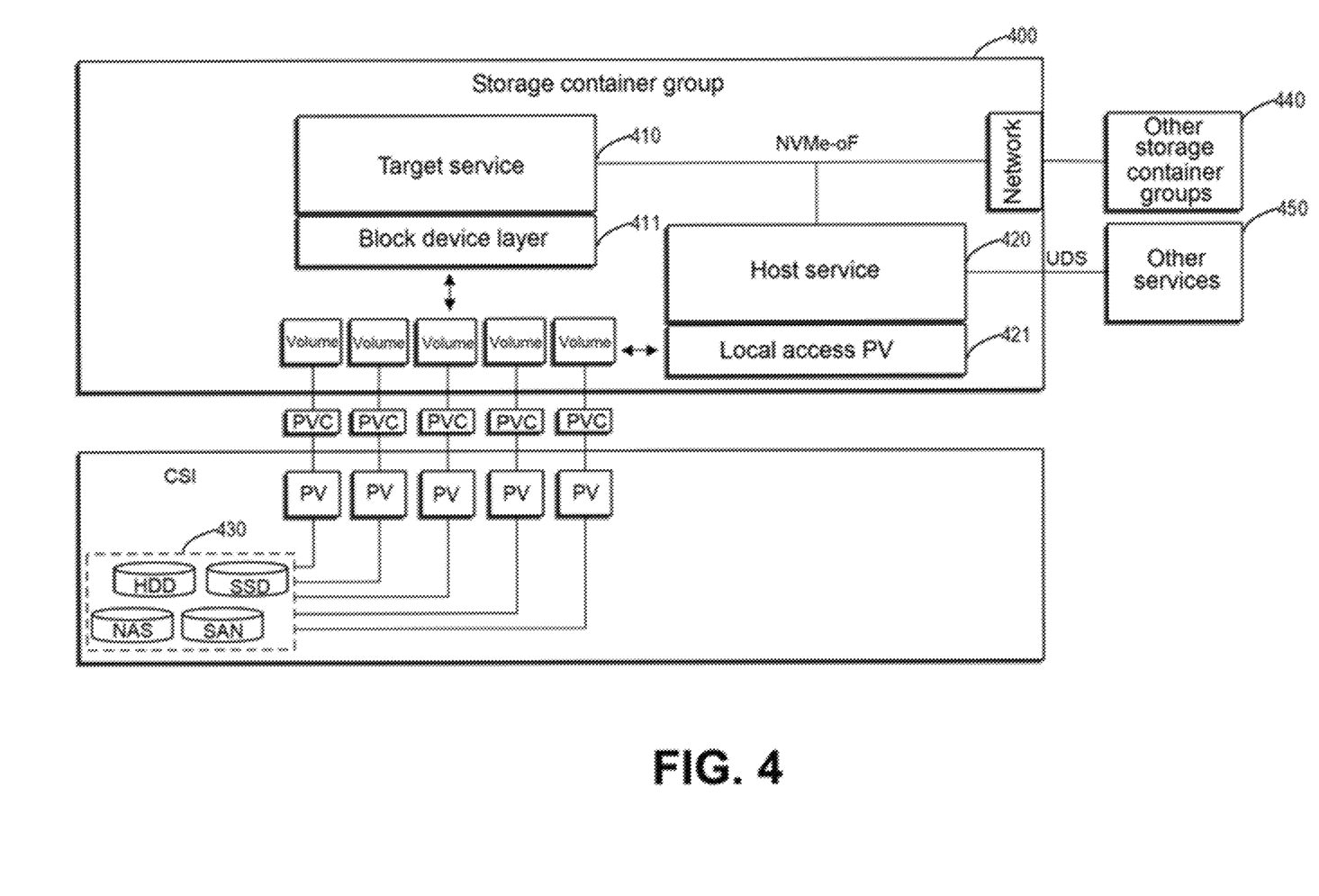
FIG. 4 illustrates a schematic diagram of the interaction of a unified block-like storage container group according to an embodiment of the present disclosure.

FIG. 4 illustrates a schematic diagram of the interaction of a unified block-like storage container group 400 according to an embodiment of the present disclosure. As illustrated in FIG. 4, the storage container group 400 includes a target service 410, a host service 420, and a plurality of volumes. The target service 410 may be attached with a block device layer 411 that includes a plurality of namespaces and a plurality of block devices, as depicted in conjunction with FIG. 3. The host service 420 is attached with a local access persistent volume 421, where this local access PV 421 is configured to access a locally stored persistent volume.

According to embodiments of the present disclosure, the unified block-like storage container group 400 may be a storage container group based on the Storage Performance Development Kit (SPDK), and such SPDK solution enables different block devices to be abstracted into NVMe-like devices, thus providing the flexibility to deploy object storage systems on cloud platforms. The SPDK lib-based NVMe-oF target is a user space target service, which enables the implementation of a complete NVMe-oF protocol at the target end. In this way, in the unified block-like storage container group 400 according to embodiments of the present disclosure, both the target service and the host service can be in the user space, making them less fragmented from each other and further reducing the risk of system degradation. It should be noted that the present disclosure is not limited to SPDK solutions, and that other different solutions that implement the target service and the host service in the user space rather than in the kernel are also feasible.

According to embodiments of the present disclosure, a storage class 430 is abstracted or represented as a plurality of persistent volumes via a container storage interface (CSI). The storage class 430 may include different types of storage media. In addition to HDDs and SDDs as discussed above, the storage class 430 may also include an NAS and an SAN for deployment of object storage systems on cloud platforms. It should be understood that, for illustrative purposes only, the number of each type of storage medium included in the storage class 430 is shown as one in FIG. 3, and each type of storage medium in the storage class 430 may have a larger number. Further, the different types of storage media included in the storage class 430 are only an example and not limiting. The storage class 430 may also include more or fewer types of storage media, and the present disclosure is not limited in this regard.

According to embodiments of the present disclosure, in the case where the second type of storage medium includes NAS and SAN, an I/O request from another container group 440 different from the container group 400 may be received. A namespace among a plurality of namespaces that is associated with the I/O request can be determined. A binary file corresponding to the determined namespace can be determined based on a mapping relationship. Reading and/or writing can be performed on a network attached storage (NAS) and a storage area network (SAN) based on the determined binary file.

According to embodiments of the present disclosure, based on persistent volume declarations, a mapping relationship is established between a plurality of persistent volumes that are created based on different types of storage media included in the storage class 430 and a plurality of volumes in the container group 400. In this way, unified access from the target service 410 to the different types of storage media is achieved based on the block-like storage access as described above.

According to embodiments of the present disclosure, an I/O request of the NVMe-oF or other different NVMe protocols from other container groups 440 different from the container group 400 may be received, and based on the mapping relationship between namespaces included in the block device layer 411 and binary files and the mapping relationship between volumes in the container group 400 and persistent volumes of different types of storage media, different types of storage media can be accessed in the block-like storage access manner. Such I/O requests are transmitted to the target service 410 via a network over an NVMe-oF connection.

According to embodiments of the present disclosure, an I/O request from another service 450 on the native machine than the target service 410 and the host service 420 may be received, and the host service 420 sends the I/O request to the target service 410 via an NVMe-oF connection, and then accesses different types of storage media in the block-like storage access manner as described above. Such I/O request is transmitted to the host service 420 via the Unix domain socket (UDS).

Alternatively or additionally, in response to receiving the I/O request via the UDS from the other service 450 on the native machine than the target service 410 and the host service 420, the host service 420 can access a volume in the container group 400 that is associated with the I/O request directly via the local access PV 421. Different types of storage media are then accessed based on the mapping relationship between the volumes in the container group 400 and the persistent volumes of the different types of storage media. In this way, network bandwidth can be saved, and better performance can be achieved.

Figure 5:
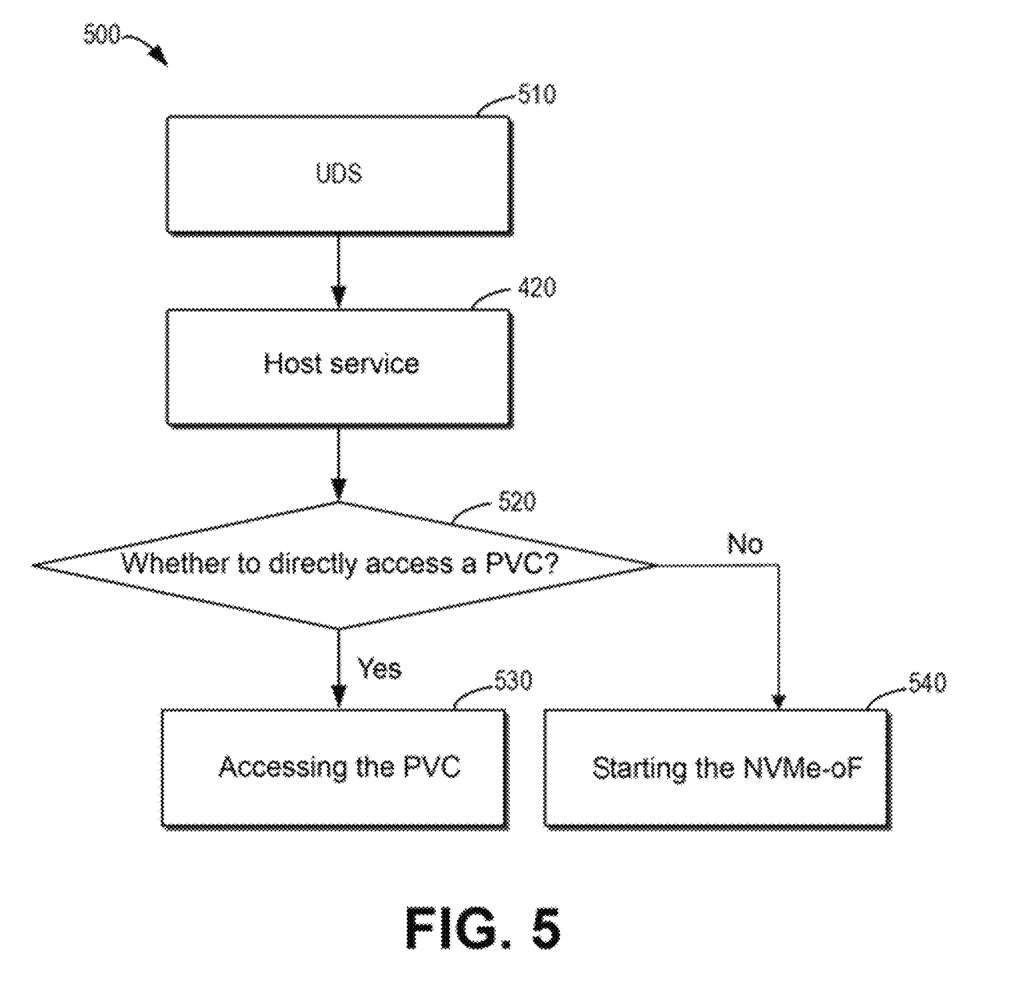
FIG. 5 is a flow chart illustrating a process for responding to an I/O request from a native service according to an embodiment of the present disclosure.

FIG. 5 is a flow chart 500 illustrating a process for responding to an I/O request from a native service according to an embodiment of the present disclosure. As described in FIG. 5, an I/O request from other services on the native machine than the target service and the host service is received via a UDS 510. At 520, the host service 420 determines whether to directly access a volume in the container group. If it is yes at 520, the process proceeds to 530 where the volume in the container group that is associated with this I/O request can be accessed directly via the local access PV, and thus the PVC corresponding to it can be accessed. If it is no at 520, the process can proceed to 540 where the NVMe-oF can be started to connect to the target service. Then, based on the mapping relationship between the namespaces included in the block device layer 411 and the binary files, the volume in the container group that is associated with that I/O request is accessed in the block-like storage access manner as described above.

Figure 6:
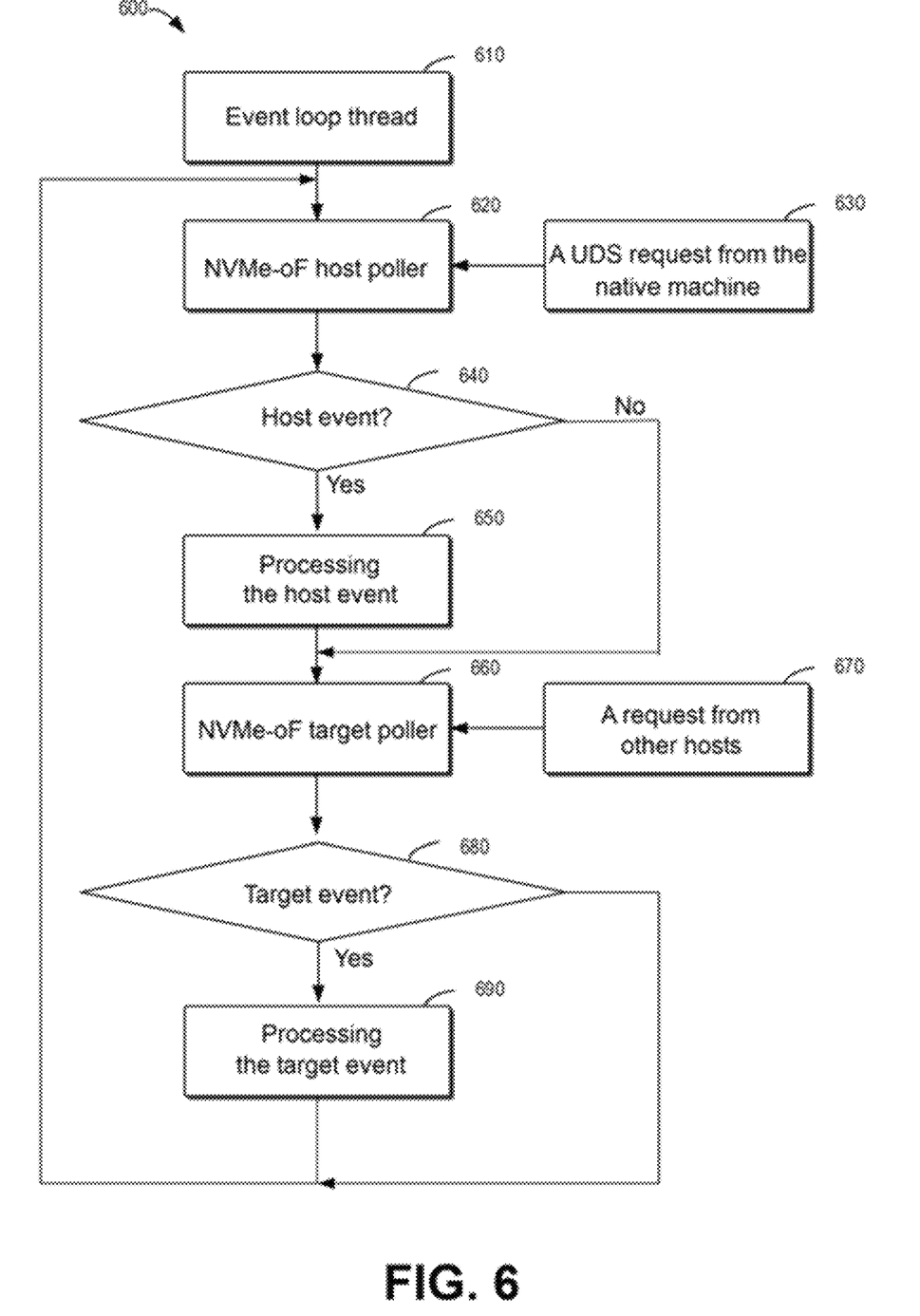
FIG. 6 is a flow chart 600 illustrating a process for a polling mechanism according to an embodiment of the present disclosure.

According to embodiments of the present disclosure, in response to writing to at least one storage medium in the plurality of different types of storage media, the state of the at least one storage medium can be polled. In response to a change in the state of the at least one storage medium, it is determined that the writing to the at least one storage medium is completed.

FIG. 6 is a flow chart 600 illustrating a process for a polling mechanism according to an embodiment of the present disclosure. From an event loop thread 610, an NVMe-oF host poller 620 receives a UDS request 630 from a native machine. At 640, it is judged whether the event is a host event. If it is yes at 640, the process proceeds to 650 where the host event is processed. If it is no at 640, the process proceeds to an operation related to an NVMe-oF target poller 660. The NVMe-oF target poller 660 receives a request 670 from other hosts. At 680, it is judged whether the event is a target event. If it is yes at 680, the process proceeds to 690 where the target event is processed. If it is no at 680, the process returns back to the beginning. A polling mechanism is used in the IO path passing through the host and the target, which makes full use of the CPU and memory. According to example embodiments, the host service and the target service are integrated into a single thread and combined with a polling mechanism, which is a flexible design.

Figure 7:
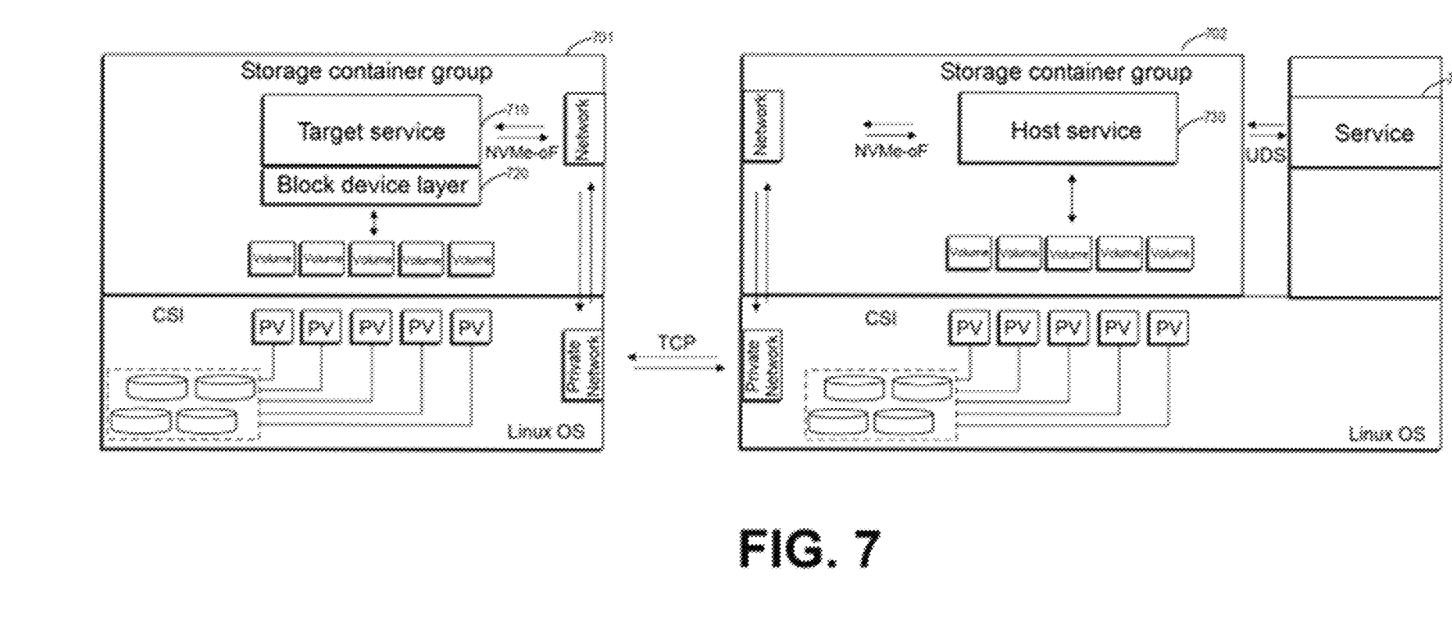
FIG. 7 illustrates the interaction between a plurality of unified block-like storage container groups according to an embodiment of the present disclosure.

FIG. 7 illustrates the interaction 700 between a plurality of unified block-like storage container groups according to an embodiment of the present disclosure. FIG. 7 illustratively shows two unified block-like storage container groups, namely, a container group 701 and a container group 702. As illustrated in FIG. 7, the storage media can be abstracted or mapped to PVs via a CSI, for example, on a Linux operating system. When a host service 730 of the container group 702 initiates access to a storage medium corresponding to the storage container group 701, a host service 730 starts an NVMe-oF and initiates an I/O request that is transmitted to a target network of the container group 701 through a path as shown in 7 via a network and a private network. The access task can then be accomplished in the block-like storage access manner according to embodiments of the present disclosure. The connection between the private networks may be based on TCP.

According to embodiments of the present disclosure, when other services 740 on the native machine want to access the storage medium on that node, the service 740 initiates an I/O request via UDS. The host service 730 may determine the volume associated with the I/O request in response to the I/O request and access the determined volume to further access the storage media on that node. It should be noted that the operations described herein are illustrative and not limiting, and other operations are also possible.

In the solution for storage according to embodiments of the present disclosure, a unified underlying storage implementation with software definition capabilities is provided, which enables different types of storage media to be operated as namespaces, thereby enabling the deployment of a storage system to adapt to more platforms and scenarios.

Figure 8:
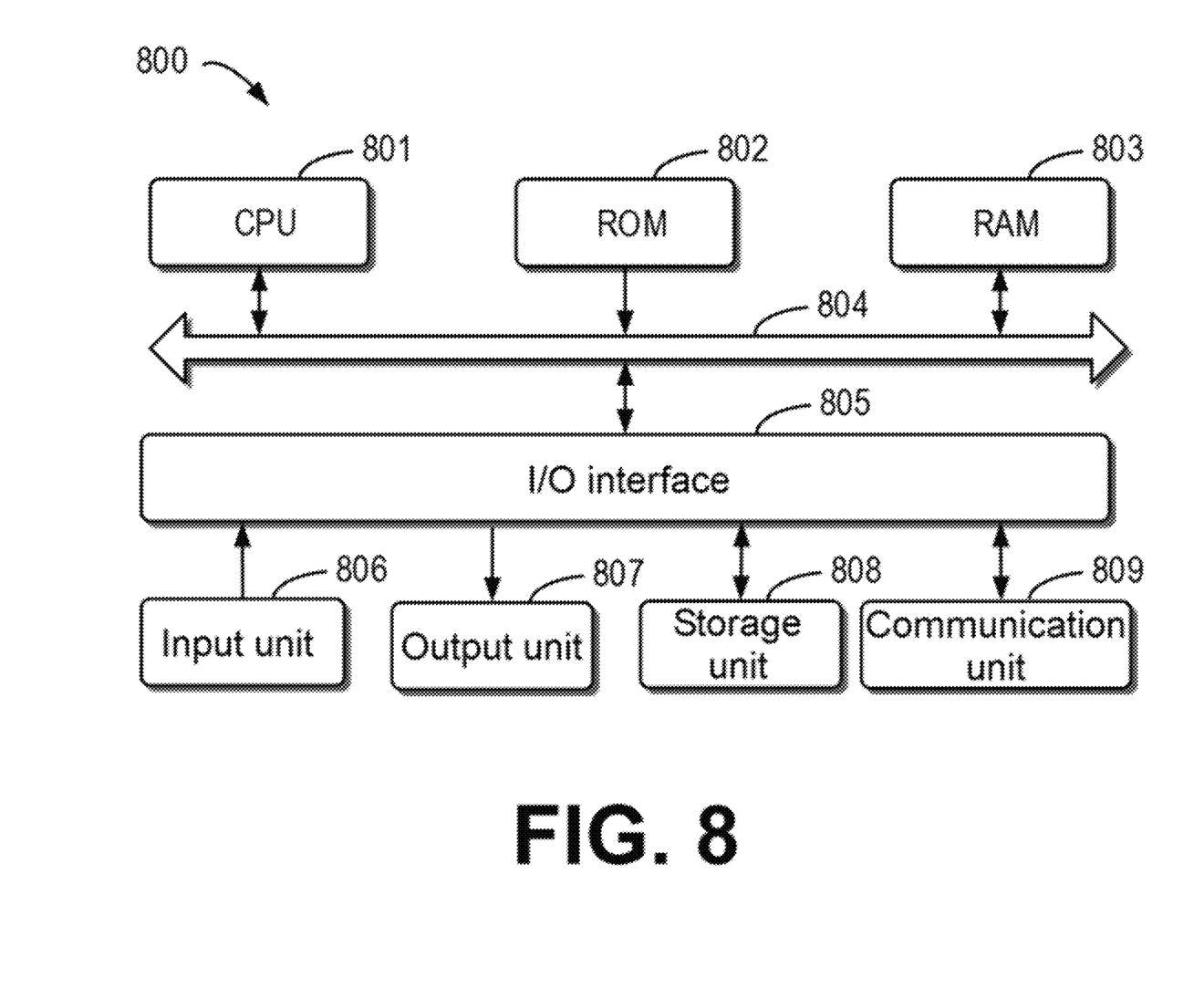
FIG. 8 illustrates a schematic block diagram of an example device that can be used to implement embodiments of the present disclosure.

FIG. 8 illustrates a schematic block diagram of an example device 800 that may be used for implementing some embodiments according to the present disclosure. As shown in FIG. 8, the device 800 includes a central processing unit (CPU) 801 that may perform various appropriate actions and processing according to computer program instructions stored in a read-only memory (ROM) 802 or computer program instructions loaded from a storage unit 808 to a random access memory (RAM) 803. Various programs and data required for the operation of the device 800 may also be stored in the RAM 803. The CPU 801, the ROM 802, and the RAM 803 are connected to each other through a bus 804. An input/Output (I/O) interface 805 is also connected to the bus 804.

A plurality of components in the device 800 are connected to the I/O interface 805, including: an input unit 806, such as a keyboard and a mouse; an output unit 807, such as various types of displays and speakers; a storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The various processes and processing described above, such as the method 200, may be performed by the processing unit 801. For example, in some embodiments, the method 200 may be implemented as a computer software program that is tangibly included in a machine-readable medium such as the storage unit 808. In some embodiments, part or all of the computer program may be loaded and/or installed onto the device 800 via the ROM 802 and/or the communication unit 809. When the computer program is loaded into the RAM 803 and executed by the CPU 801, one or more actions of the method 200 described above may be implemented.

The present disclosure may be a method, an apparatus, a system, and/or a computer program product. The computer program product may include a computer-readable storage medium on which computer-readable program instructions for performing various example embodiments of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various example embodiments of the present disclosure.

Various example embodiments of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various example embodiments of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

What is claimed is:

1. A method, comprising:
   receiving, by a system comprising at least one processor, an input/output request based on a protocol related to a first type of storage medium;
   determining, by the system, a namespace, among namespaces, that is associated with the input/output request, resulting in a determined namespace;
   determining, by the system, a binary file corresponding to the determined namespace based on a mapping relationship, resulting in a determined binary file; and
   at least one of reading from, by the system, or writing to, by the system, a second type of storage medium based on the determined binary file, the second type being different from the first type, wherein binary files, comprised in a first container group that corresponds to a hard disk drive (HDD), are arranged by a file system of the HDD to correspond to respective volumes in the first container group, wherein the first container group comprises a first target service and a first host service, wherein the input/output request is from a second host service of a second container group different from the first container group, wherein the first target service and a second target service of the second container group comprise a user space target service, and wherein the first host service and the second host service comprise a user space host service.

2. The method according to claim 1, wherein the protocol comprises a Non-Volatile Memory express over Fabric (NVMe-oF) protocol, and wherein the first type of storage medium comprises a solid state drive type.

3. The method according to claim 1, further comprising:
   mapping, by the system, the binary files to the first target service in the first container group, resulting in the binary files corresponding to respective block devices in a block device layer; and
   assigning, by the system, respective namespaces of the namespaces to the respective block devices resulting in respective assigned namespaces, wherein the respective assigned namespaces identify the respective block devices, and wherein the block device layer comprises the respective block devices and the respective namespaces.

4. The method according to claim 1, wherein:
   the binary files are of a fixed size;
   a usage status of the binary files is recorded by a service; and
   a data size used to access the binary files is aligned with a block size.

5. The method according to claim 3, wherein mapping the binary files to the first target service comprises avoiding mapping pages in the binary files to the first target service that are used to store metadata.

6. The method according to claim 1, further comprising:
   creating, by the system, persistent volumes based on the first type of storage medium and the second type of storage medium; and
   mapping, by the system, the persistent volumes to the respective volumes in the first container group via corresponding respective persistent volume declarations.

7. The method according to claim 1, wherein the input/output request comprises a first input/output request, and wherein the method further comprises:
   receiving, by the system, a second input/output request from a third host service on a native machine, wherein the third host service is different from the first target service and the first host service; and
   accessing, by the system, a volume among the respective volumes that is associated with the second input/output request.

8. The method according to claim 1, further comprising:
   polling, by the system, in response to writing to at least one storage medium of the first type of storage medium and the second type of storage medium, a state of the at least one storage medium; and
   determining, by the system, in response to a change in the state of the at least one storage medium, that the writing to the at least one storage medium is completed.

9. The method according to claim 1, further comprising:
   receiving, by the system, a third input/output request from the second host service;
   determining, by the system, a second namespace among the namespaces that is associated with the third input/output request, resulting in a determined second namespace;
   determining, by the system, a second binary file corresponding to the determined second namespace based on the mapping relationship, resulting in a determined second binary file; and
   at least one of reading from, by the system, or writing to, by the system, a network attached storage and a storage area network based on the determined second binary file.

10. A device, comprising:
    a processor; and
    a memory coupled to the processor and storing instructions, wherein the instructions, when executed by the processor, cause the device to perform actions comprising:
      based on a protocol related to a first type of storage medium, receiving an input/output request;
      determining a namespace, among namespaces, that is associated with the input/output request;
      determining a binary file corresponding to the namespace based on a mapping relationship; and
      based on the binary file, reading from a second type of storage medium, the second type being different from the first type, wherein binary files, comprised in a first container group that corresponds to a hard disk drive (HDD), are arranged by a file system of the HDD to correspond to respective volumes in the first container group, wherein the first container group comprises a first target service and a first host service, wherein the input/output request is from a second host service of a second container group different from the first container group, wherein the first target service and a second target service of the second container group comprise a user space target service, and wherein the first host service and the second host service comprise a user space host service.

11. The device according to claim 10, wherein the protocol comprises a Non-Volatile Memory express over Fabric (NVMe-oF) protocol, and wherein the first type of storage medium comprises a solid state drive type.

12. The device according to claim 10, wherein the actions further comprise:
mapping the binary files to the first target service in the first container group, resulting in the binary files corresponding to respective block devices in a block device layer;
assigning a corresponding namespace of the namespaces to a block device of the respective block devices, wherein the corresponding namespace identifies the block device, and wherein the block device layer comprises the respective block devices and the namespaces; and
avoiding, in the mapping of the binary files to the first target service, mapping pages in the binary files to the first target service that are used to store metadata.

13. The device according to claim 10, wherein;
the binary files are of a fixed size;
a usage status of the binary files is recorded by a service; and
a data size used to access the binary files is aligned with a block size.

14. The device according to claim 10, wherein the actions further comprise:
creating persistent volumes based on the first type of storage medium and the second type of storage medium; and
mapping the persistent volumes to the respective volumes in the first container group via corresponding respective persistent volume declarations.

15. The device according to claim 10, wherein the input/output request comprises a first input/output request, and wherein the actions further comprise:
receiving a second input/output request from a third host service on a native machine, wherein the third host service is different from the first target service and the first host service; and
accessing a volume among the respective volumes that is associated with the second input/output request.

16. The device according to claim 10, wherein the actions further comprise:
receiving a third input/output request from the second host service;
determining a second namespace among the namespaces that is associated with the third input/output request;
based on the mapping relationship, determining a second binary file corresponding to the second namespace; and
based on the second binary file, reading from a network attached storage and a storage area network.

17. A computer program product, the computer program product being stored on a non-transitory computer-readable medium and comprising machine-executable instructions, wherein the machine-executable instructions, when executed, cause a machine to perform operations, comprising:
receiving an input/output request based on a protocol related to a first type of storage medium;
determining a namespace, among namespaces, that is associated with the input/output request;
determining a binary file corresponding to the namespace based on a mapping relationship; and
based on the binary file, writing to a second type of storage medium, the second type being different from the first type, wherein binary files, comprised in a first container group that corresponds to a hard disk drive (HDD), are arranged by a file system of the HDD to correspond to respective volumes in the first container group, wherein the first container group comprises a first target service and a first host service, wherein the input/output request is from a second host service of a second container group different from the first container group, wherein the first target service and a second target service of the second container group comprise a user space target service, and wherein the first host service and the second host service comprise a user space host service.

18. The computer program product according to claim 17, wherein the operations further comprise:
polling, in response to writing to at least one storage medium of the first type of storage medium and the second type of storage medium, a state of the at least one storage medium; and
determining, in response to a change in the state of the at least one storage medium, that the writing to the at least one storage medium is completed.

19. The computer program product according to claim 17, wherein the protocol comprises a Non-Volatile Memory express over Fabric (NVMe-oF) protocol, and wherein the first type of storage medium comprises a solid state drive type.

20. The computer program product according to claim 17, wherein:
the binary files are of a fixed size;
a usage status of the binary files is recorded by a service; and
a data size used to access the binary files is aligned with a block size.

* * * * *